Nov. 4, 1924.
R. S. OLMSTED
1,514,394
INSTRUMENT FOR MEASURING HORIZONTAL ANGLES
Filed April 18, 1921     4 Sheets-Sheet 1
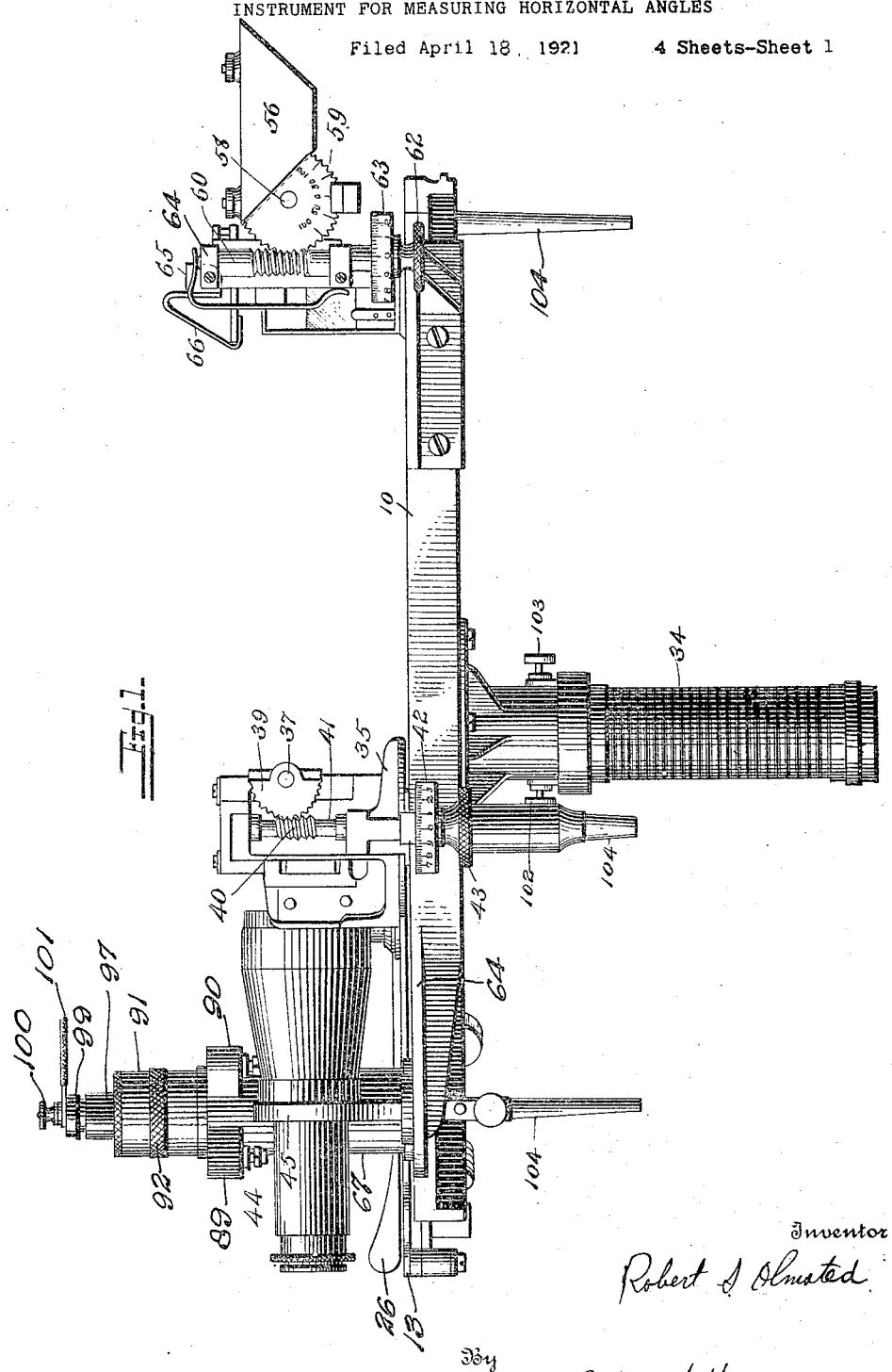
Inventor
Robert S. Olmsted
By
Robert H. Young  Attorney

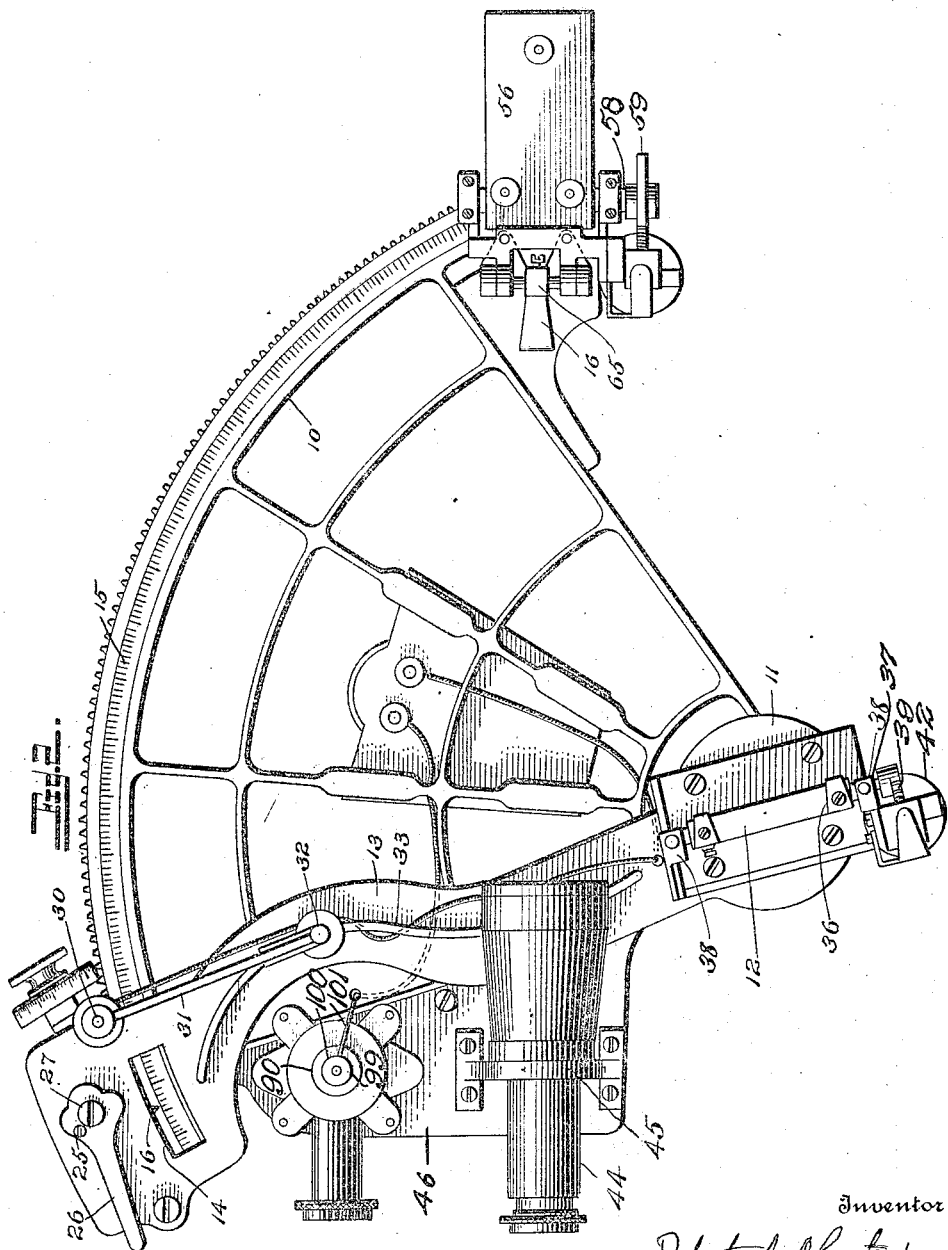

Nov. 4, 1924.
R. S. OLMSTED
1,514,394
INSTRUMENT FOR MEASURING HORIZONTAL ANGLES
Filed April 18, 1921   4 Sheets-Sheet 3
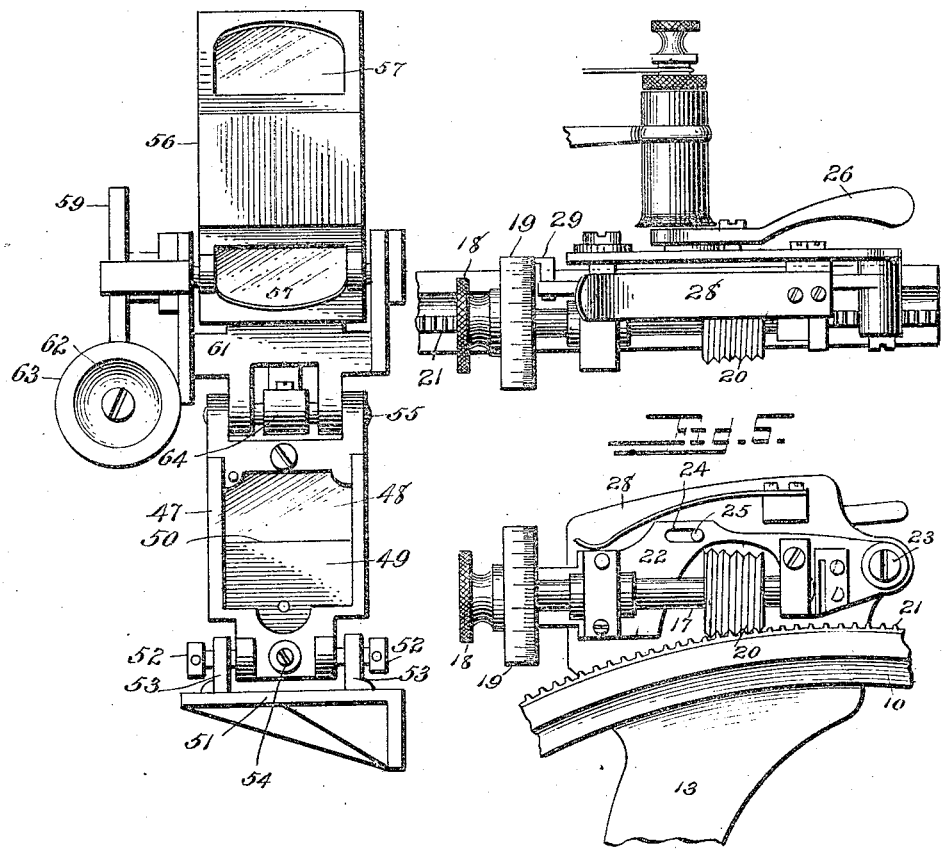
Inventor
Robert S. Olmsted
By Robert H Young — Attorney Nov. 4, 1924.
R. S. OLMSTED
1,514,394
INSTRUMENT FOR MEASURING HORIZONTAL ANGLES
Filed April 18, 1921   4 Sheets-Sheet 4
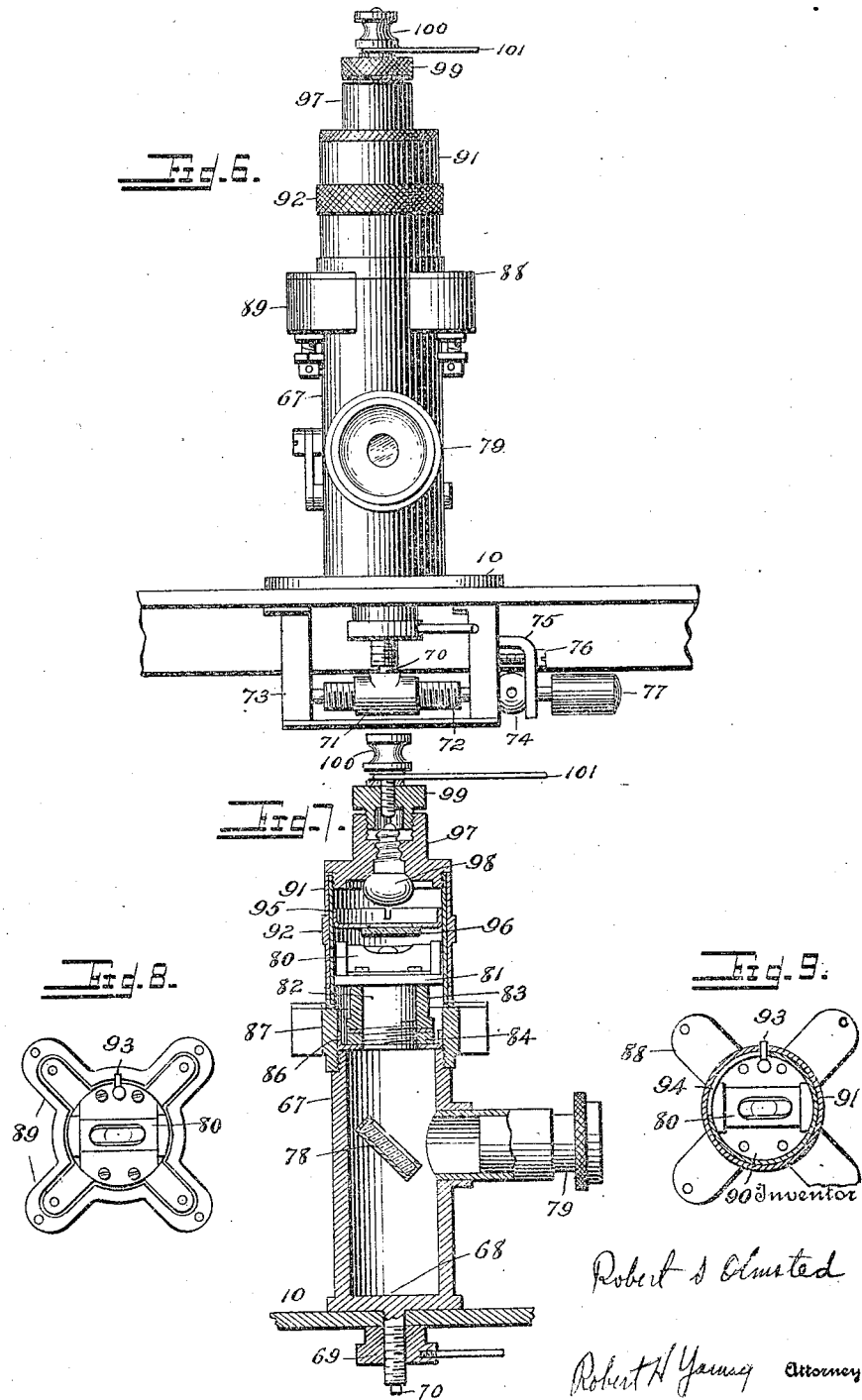

Patented Nov. 4, 1924.

1,514,394

UNITED STATES PATENT OFFICE.

ROBERT S. OLMSTED, OF READING, MASSACHUSETTS.

INSTRUMENT FOR MEASURING HORIZONTAL ANGLES.

Application filed April 18, 1921. Serial No. 462,086.

*To all whom it may concern:*

Be it known that I, ROBERT S. OLMSTED, a citizen of the United States, residing at Reading, in the county of Middlesex and State of Massachusetts, have invented certain new and useful Improvements in Instruments for Measuring Horizontal Angles, of which the following is a specification.

My invention relates to devices for accurately determining or measuring horizontal angles, being especially designed for use in captive balloons or the like and for the purpose, for example, of directing artillery fire. It will be apparent, however, that the instrument herein shown and described may be utilized for various other purposes which will suggest themselves.

The improved device consists of an instrument resembling somewhat a modified sextant, the improved instrument being designed for the special purpose of determining or accurately measuring horizontal angles or the intervening angle between two distantly located points, which points are usually on or in proximity to the horizon. The improved instrument is designed to be held in the hand in a horizontal plane, and for that purpose is provided with means for determining the horizontality of the instrument, before and during observations. When properly adjusted by the means hereinafter described, accurate observations may be made from a balloon on targets and aiming points which are ordinarily at a level or in a horizontal plane below that of the balloon in which the instrument is carried.

With the above and other objects in view, the invention consists in the novel construction, combination and arrangement herein fully described, illustrated and claimed.

In the accompanying drawings:—

Figure 1 is an elevation of the improved instrument.

Figure 2 is a top plan view of the same.

Figure 3 is a fragmentary elevation of the horizon glass and the adjustable prism surmounting the same, the prism frame being, for the purpose of better illustration, thrown upwardly to a substantially vertical position.

Figure 4 is a fragmentary elevation showing the means for adjusting the index arm in relation to the limb.

Figure 5 is a bottom plan view of the same.

Figure 6 is a front elevation of the leveling means.

Figure 7 is a vertical sectional view of the same.

Figure 8 is a plan view of the bubble sight with the superposed sight illuminating means omitted.

Figure 9 is a horizontal section through the leveling means taken just above the bubble sight, showing the means for turning the bubble sight through an arc of 90 degrees.

The improved instrument comprises a quadrant-shaped limb 10 of quadrantal formation, as shown in Figure 2, and made in the form of a skeleton frame having the necessary lightness and rigidity combined. 11 designates a turn-table which is mounted to turn on a vertical axis at the point 12 in relation to the limb 10. Extending from the turn-table 11 is an index arm 13 which is adapted to sweep over the limb 10, the outer end of said index arm having an observation slot 14 through which may be seen the graduations 15 upon and adjacent to the periphery of the limb 10. An indicating pointer 16 is carried by the index arm and adapted to register with the graduations 15 as said arm is swung over the limb.

Journaled in bearings on a swing frame under the outer end of the index arm is a worm shaft 17 having an operating knob 18 at one end and also having a graduated dial or cylinder 19 fast thereon. The shaft 17 carries a worm 20 which meshes with a rack face 21 on the limb 10, as shown in Figure 5. The swing frame 22 is connected by a pivot 23 to the index arm 13 and embodies a slot 24 into which projects an eccentric pin 25 extending from a cam lever 26 pivotally mounted at 27 on top of the index arm 13, as shown in Figure 2. The pin 25 operates in an arcuate slot, not shown, in the index arm. Normally the worm 20 is held in engagement with the rack face 21 by a spring 28 (see Figure 5). By means of the cam lever 26 the worm 20 may be disengaged from the rack face 21, thereby permitting the index arm to be swung quickly over the limb to the approximate desired point at which an accurate adjustment of the index arm may be obtained by turning the knob 18, whereupon a pointer 29 on the index arm registers with a certain graduation on the cylinder or dial 19. This enables the angle between the target and the aiming point to be accurately measured.

30 designates an electric lamp holder carried by the free end of a supporting arm 31, which is pivotally mounted on a post 32 on the index arm, a flexible wire 33 leading from the lamp holder 30 to a battery contained in the main handle 34 by which the instrument is held in the hand of the observer. The lamp in the holder 30 is used to illuminate the graduations 15 of the limb in making observations at night.

Mounted fixedly upon the turn-table 11 is a supporting frame 35 for an index mirror 36. This mirror is mounted to turn on a normally horizontal axis by means of a shaft 37, fixedly attached to the mirror and mounted to turn in bearings 38 on the frame 35. One end of the shaft 37 projects and has fast thereon a toothed sector 39 which meshes with a worm 40 on a vertical shaft 41 journaled in bearings in the frame 35 and having fast thereon a graduated dial or cylinder 42 and operable by means of a milled wheel or knob 43. By turning the knob 43 the index mirror 36 may be adjusted to the proper angle to throw the image reflected thereby against the horizon glass hereinafter referred to. It will now be observed that as the index arm sweeps over the limb 10, the index mirror 36, the frame of which has a fixed relation to the index arm, turns with said arm. The only movement which the index mirror has in relation to the index arm is its movement about a normally horizontal axis, or an axis parallel to the normally horizontal plane of the limb 10.

A sighting tube 44 is normally fixed in relation to a support 45 therefor, which support is fixedly secured to an extension leaf 46 of the limb 10 as shown. The sighting tube 44 has a threaded connection with the support 45 so that it may be detached for any necessary purpose. Normally, however, the sighting tube 44 has a fixed relation to the limb 10.

Arranged directly in line with the sighting tube 44 is a horizon glass frame 47. The horizon glass is divided into an upper clear glass section 48 and a lower silvered glass section 49, the sections 48 and 49 meeting on an artificial horizon line 50, as shown in Figure 3. The horizon glass has a normally fixed relation to a supporting bracket 51 secured fixedly to the limb 10. The horizon glass may, however, be shifted laterally for careful observation by means of oppositely arranged gauge screws 52 threaded through posts 53 on the bracket 51. A binding screw 54 maintains the adjustment just referred to.

Connected to the upper part of the horizon glass frame by means of a pivot 55 is a prism holder or casing 56 containing a double prism 57 the shape of which is indicated by the shape of the holder 56 in Fig. 1 which serves to bend the rays of light from a given object into line with the focal axis of the sighting tube 44. Normally, the holder 56 occupies substantially the horizontal position shown in Figure 1, but by means of the pivotal connection at 55 the said holder may be swung from its useful position upwardly to a substantially vertical position, as indicated in Figure 3, to facilitate adjustment and cleaning. The holder 56 is mounted to turn on a horizontal axis, represented by a rock-shaft 58. The means for adjusting the angle of the holder 56 consists of a toothed segment 59 having a fixed relation to the holder 56 and the shaft 58 and operated by a vertical worm shaft 60 journaled in bearings in a prism supporting frame 61. The shaft 60 is operated by a milled wheel or knob 62 and has fast thereon a graduated dial or cylinder 63 cooperating with a mark on the frame 61. The means just described enables the angle of the prism and its holder to be accurately determined. Fast on the shaft 60 is a collar 64 having a portion or extension 65 with a plurality of flat faces at an angle to each other to engage a retaining spring 66, the latter pressing against the extension 65 to hold the prism frame 56 either in the operating position shown in Figure 1 or in the raised position shown in Figure 3.

The level sighting means illustrated in detail in Figures 6 to 9 inclusive, comprises a tubular standard 67 having a base 68 which rests in contact with the upper surface of the limb 10 and is adjustable toward and away from the sighting tube 44 in order to regulate the interpupillary distance between the sighting tube and the level sighting means. To this end a threaded shank 69 extends downwardly from the bottom of the standard 68 and is movable in a slot in the limb 10, which slot extends lengthwise in the direction of the sighting tube 44. The lower end of the shank 69 terminates in a downwardly projecting pintle 70 received in a socket in the upper side of a traveler 71, which is internally threaded to engage a feed-screw 72 journaled in bearings in a sub-frame 73 secured fixedly to the under side of the limb 10. The shaft of the feed-screw 72 is formed with a ball thrust shoulder 74, which at one side engages the sub-frame 73 and at the other side is held by an adjustable bearing member 75 positioned by a set-screw 76 threaded into the sub-frame 73. The shaft of the feed-screw 72 is also provided with an operating knob 77 by means of which the screw 72 may be rotated for the purpose of shifting the traveler 71 and thereby adjusting the interpupillary distance between the level sighting means and the sighting tube 44.

The tubular standard 67 contains a reflector or mirror 78, opposite which is a normally horizontal eye-piece 79. Arranged above the reflector 78 is a bubble sight 80 mounted upon a support 81 having a downwardly extending neck 82, the latter passing through a sleeve 83 and being clamped therein by a nut 84 and washer 85. The nut 84 is held in a cupped ring 86 which rests upon the upper end of the standard 67, as shown in Figure 7, and within a cap-piece 87 threaded on the upper end of the standard 67. Extending outwardly from the cap-piece 87 are ears 88 to which are fastened, by screws or the equivalent thereof, corresponding ears 89 on the lower end of a hollow cylindrical bubble case 90, which may be turned through an arc of 90 degrees to impart a corresponding movement to the bubble sight 80 in obtaining the proper leveling of the instrument. The bubble sight is turned by means of an outer tubular jacket or sleeve 91, having a knurled face 92 and carrying a pin 93 fastened to the bubble sight and working lengthwise in an arcuate slot 94 in the case 90.

Mounted within the case 90 is a cupped holder 95 containing a tinted glass 96, the tint being preferably of a light blue color. Above the glass 96 is a lamp socket 97 threaded into the case 90 and carrying an electric lamp 98. Threaded into the upper end of the socket 97 is a screw-plug 99 carrying a binding post 100, from which a flexible wire 101 leads to the battery in the handle 34. The handle 34 is equipped with circuit closing buttons 102 and 103, one of which controls the lamp 30 and the other of which controls the lamp 98 to enable the instrument to be used at night time. When the handle 34 is removed for the purpose of resting the instrument on a table or the like, the limb 10 has a plurality of supporting legs 104, as shown in Figure 1.

The operation of the instrument will now be described: The rays of light from the aiming point or fixed object selected are reflected by the index mirror 12 upon the silvered portion 49 of the horizon glass for observation through the sighting tube 44, which is aimed directly at the horizon glass. The target is visible in the usual way through the upper transparent portion 48 of the horizon glass. The index mirror is turned about its vertical axis by moving the index arm over the limb 10 to bring the aiming point into the horizon glass. The index mirror is also tilted about its horizontal axis to bring the aiming point into the horizon glass. Keeping in mind that the aiming point is on a lower level than that of the balloon in which the instrument is being used, the aiming point is brought into the silvered portion of the horizon glass so that some given point of the aiming point or object touches the line 50 which marks the dividing line between the two portions 48 and 49 of the horizon glass. While this adjustment is being made, care should be taken that the bubble tube 80 indicates that the limb 10 is level.

After making the above adjustment, the bubble tube 80 is turned through an arc of 90 degrees and the graduated limb 10 again leveled. Keeping the limb 10 level, the target is brought into a position where some definite part of the target, such as the water line of a ship, coincides with the line 50. When the above adjustments have been made, further leveling of the instrument may be dispensed with. All that is necessary in subsequent observations is to bring the desired part of the target to the line 50 and also to bring, for example, the water line of the ship up to the said line 50, said positions proving that the instrument is properly leveled. As the target moves, adjustments must be made either by manipulation of the micrometer screw, which sets the index arm, or by adjustment of the angle of the index mirror. The point to be emphasized, however, is that the proper positioning of the aiming point and the target on the horizon glass indicates the proper leveling of the instrument and dispenses with the necessity of leveling up the instrument for each observation, a feature obviously of great advantage in military operations where rapidity is of vital importance.

While I have disclosed an embodiment of my invention, it will be understood that other ways and means of carrying out the principles involved may be resorted to, the present showing being merely illustrative.

Having thus fully described the invention, what is claimed is:

1. In a hand instrument for determining horizontal angles, a normally horizontal graduated limb, a sighting tube fixed on said limb, a horizon glass fast on said limb in fixed relation to the sighting tube, an index arm pivoted to sweep in an arc over said limb, an index mirror mounted on said arm to swing therewith on a normally vertical axis and also adapted to be turned about an axis parallel to the plane of the limb, and means to bend the rays of light from any horizontal plane other than that of the instrument into the sighting tube.

2. In a hand instrument for determining horizontal angles, a normally horizontal graduated limb, a sighting tube fixed on said limb, a horizon glass fast on said limb in fixed relation to the sighting tube, an index arm pivoted to sweep in an arc over said limb, an index mirror mounted on said arm to swing therewith on a normally vertical axis and also adapted to be turned about an axis parallel to the plane of the limb, and a revolubly mounted adjustable prism adapted to bend the rays of light from any horizontal plane other than that of the instrument into the sighting tube.

3. In a hand instrument for determining horizontal angles, a normally horizontal graduated limb, a sighting tube fixed on said limb, a horizon glass fast on said limb in fixed relation to the sighting tube, an index arm pivoted to sweep in an arc over said limb, an index mirror mounted on said arm to swing therewith on a normally vertical axis and also adapted to be turned about an axis parallel to the plane of the limb, a revolubly mounted adjustable prism adapted to bend the rays of light from any horizontal plane other than that of the instrument into the sighting tube, and means for partially revolving said prism.

4. In a hand instrument for determining horizontal angles, a normally horizontal graduated limb, a sighting tube fixed on said limb, a horizon glass fast on said limb in fixed relation to the sighting tube, an index arm pivoted to sweep in an arc over said limb, an index mirror mounted on said arm to swing therewith on a normally vertical axis and also adapted to be turned about an axis parallel to the plane of the limb, a revolubly mounted adjustable prism adapted to bend the rays of light from any horizontal plane other than that of the instrument into the sighting tube, calibrated means for adjusting the angle of said prism, and means for measuring the angle of said prism.

5. In a hand instrument for determining horizontal angles, a normally horizontal graduated limb, a sighting tube fixed on said limb, a horizon glass fast on said limb in fixed relation to the sighting tube, an index arm pivoted to sweep in an arc over said limb, an index mirror mounted on said arm to swing therewith on a normally vertical axis and also adapted to be turned about an axis parallel to the plane of the limb, means for adjusting the angle of said index mirror on a normally horizontal axis, and means to bend the rays of light from any horizontal plane other than that of the instrument into the sighting tube.

6. In a hand instrument for determining horizontal angles, a normally horizontal graduated limb, a sighting tube fixed on said limb, a horizon glass fast on said limb in fixed relation to the sighting tube, an index arm pivoted to sweep in an arc over said limb, an index mirror mounted on said arm to swing therewith on a normally vertical axis and also adapted to be turned about an axis parallel to the plane of the limb, means for adjusting the angle of said index mirror about such axis, means for measuring the angle of the index mirror, and means to bend the rays of light from any horizontal plane other than that of the instrument into the sighting tube.

7. In a hand instrument for determining horizontal angles, a normally horizontal graduated limb, a sighting tube fixed on said limb, sighting means for leveling said limb, means for adjusting the interpupillary distance between said sighting tube and said sighting means, a horizon glass fast on said limb in fixed relation to the sighting tube, an index arm pivoted to sweep in an arc over said limb, an index mirror mounted on said arm to swing therewith on a normally vertical axis and angularly adjustable on an axis parallel to the plane of the limb, and means to bend the rays of light from any horizontal plane other than that of the instrument into the sighting tube.

In testimony whereof I affix my signature.

ROBERT S. OLMSTED.